United States Patent Office 3,109,017
Patented Oct. 29, 1963

3,109,017
MANUFACTURE OF ESTERS
Richard D. Gorsich, Baton Rouge, La., assignor to Ethyl Corporation, New York, N.Y., a corporation of Virginia
No Drawing. Filed Mar. 22, 1961, Ser. No. 97,433
9 Claims. (Cl. 260—475)

This invention relates to a process for the production of esters of aromatic carboxylic acids.

Many processes are known for producing esters, these compounds being useful for a variety of purposes including use as plasticizers, lacquer solvents, as intermediates for use in preparation of synthetic fibers and as constituents for lubricants. Such processes for producing esters include the action of carboxylic acids on hydroxy compounds; action of acyl halides, anhydrides, ketenes and phosgenes on hydroxy compounds; action of halides, alkyl chlorosulfites, and alkyl sulfates on the salts of carboxylic acids; and the action of diazomethane on carboxylic acids.

Among the best and most frequently used of all of the processes for producing esters is that involving the action of a concentrated alcohol on a concentrated carboxylic acid in the presence of concentrated sulfuric acid or other acid catalyst. After a sufficient degree of reaction the water formed in the esterification reaction is generally removed by distillation. While this process has been commercially successful it is nevertheless deficient in several respects, chief among which are that the rate of reaction is generally quite slow and the yields very poor, particularly in regard to manufacturing certain esters. Thus, the speed of the reaction, among other things, is even negatively altered by the very nature of the carboxylic acid and alcohol itself. With regard to the latter, tertiary alcohols react more slowly than secondary alcohols, and the latter even more slowly than primary alcohols. As regards the acid, the difficulty of esterification, inter alia, increases with molecular weight and with the number of carboxylic groups in the molecule. Aromatic carboxylic acids, especially aromatic polybasic acids, are difficult to esterify in general and suitable yields of esters can be obtained from such prior processes only after conducting the reaction over inordinately long periods of time.

Thus, a major problem confronted by the art in connection with the preparation of esters of aromatic carboxylic acids, particularly esters of polybasic aromatic carboxylic acids, is that of obtaining suitable yields within reasonable periods of time.

The object of the present invention is therefore to advance the state of the art by providing a new and improved process having advantages associated therewith which are, among other things, related to the solution of the above problems. Specifically therefore, it is among the objects of this invention to overcome the foregoing disadvantages by providing a new and improved method for the production of esters of aromatic carboxylic acids. More specifically, it is an object to provide a method for the production of esters from aromatic carboxylic acids, especially from aromatic polycarboxylic acids, wherein the rate of reaction is extremely rapid and the yield of aromatic ester is quite high.

The foregoing and other objects are achieved in accordance with this invention which provides a method for producing an ester of an aromatic carboxylic acid by contacting a tertiary phosphate ester with an aromatic carboxylic acid in the presence of an acid catalyst.

Pursuant to this invention, high yields of esters of aromatic carboxylic acids are produced in short periods of time. By forming, within a reaction zone, a mixture of a tertiary phosphate ester, an aromatic carboxylic acid and an acid catalyst, then subjecting the mixture to an elevated temperature sufficient to effect said reaction, there is produced an ester of the aromatic carboxylic acid within a very short period of time. The ester of the aromatic carboxylic acid contained within the reaction mixture can be separated therefrom quite readily by conventional techniques.

The preferred tertiary phosphate esters are characterized by containing from 3 to 30 carbon atoms in the molecule. The hydrocarbon substituents or radicals can be cyclic or acyclic, and where acyclic can be straight chain or branch chain. Where the substituents or radicals are cyclic, the member can be aromatic or alicyclic, carbocyclic or heterocyclic. Exemplary of such cyclic and acyclic substitutents are alkyls, alkenyls, alkynyls, aryls, aralkyls, alkaryls, cycloalkyls, cycloalkenyls, cycloalkenylalkyls, and heterocyclics, each generally containing from 1 to about 10 carbon atoms. These hydrocarbon radicals, whether cyclic or acyclic, can also be substituted or unsubstituted. Where substituted the radical can contain one or more substituents provided that these substituted members in the radical, or radicals, are substantially inert and do not complete in the principal reaction. Generally the individual radical can contain from 1 to about 3 such substituted members exemplary of which are halogens, such as chlorine, bromine and the like, pseudo-halogens such as thiocyanate and the like, phosphorus, nitrogen, sulfur, oxygen and the like. Exemplary tertiary phosphate esters defined by such hydrocarbon radicals and substituted radicals are such alkyl compounds as tri-β-chloroethyl phosphate, triamyl phosphate, ethylhexyloctyl phosphate, tridecyl phosphate and the like; such trialkenyl and trialkynyl phosphates as triallyl phosphate, tripropynyl phosphate, tri(2-butenyl)phosphate, tri(3-butynyl)-phosphate, tri(1,5-hexadiynyl)phosphate and the like; such aryl phosphates as tri-o-tolyl phosphate, tri-o-chlorophenyl phosphate, tris(3,5-dichlorophenyl)phosphate, di-m-tolyl-o-diphenyl phosphate, di-m-tolyl-o-nitrophenyl phosphate, di-m-tolyl(2,4-dibromophenyl)phosphate and the like; such mixed alkyl aryl phosphates as n-propyl di-m-tolyl phosphate, n-amyl di-m-tolyl phosphate, dodecyl di-m-tolyl phosphate, cyclohexyl di-o-chlorophenyl phosphate, 4-methylcyclohexyl di-m-tolyl phosphate, and the like; and such mixed alkenyl aryl phosphates, alkenyl cycloalkenyl phosphates and alkynyl aryl phosphates as 3-butenyl dibenzyl phosphate, 6-octenyl dicyclopentenyl phosphate, di(2-butynyl) benzyl phosphate and the like. Other suitable compounds are listed at pages 258–266, Kosolapoff, Organophosphorus Compounds, Wiley and Sons (1950) and are included herein by reference.

More preferred tertiary phosphate esters are those characterized by containing like hydrocarbon groups in the molecule, since these esters generally yield purer products when employed as the esterification agent. Exemplary of such tertiary phosphate esters are tributyl phosphate, triheptyl phosphate, tribenzyl phosphate, tricresyl phosphate, and the like.

The trialkyl phosphate esters containing substituents having from 1 to about 10 carbon atoms each are the most preferred phosphates because they give significant yields of ester in fairly short periods of time. Particularly preferred trialkyl phosphates are those containing up to 6 carbon atoms in the molecule. Outstanding in this class of phosphates are trimethyl phosphate and triethyl phosphate.

Preferred aromatic carboxylic acids suitable for the practice of this invention are those containing in the molecule from 1 to about 6 carboxylic groups, from 7 to about 24 carbon atoms and from 1 to about 4 aromatic rings which can be either fused or non-fused. Exemplary of such compounds are benzoic acid, p-aminobenzoic acid, 2-naphthoic acid, 1-phenanthrenebutyric acid, [bicyclohexyl]-2-carboxylic acid, [p-terphenyl]-3-carboxylic acid, hemimellitic acid, naphthalic acid, 1,4,5,8,9,10-anthracenehexacarboxylic acid, and the like.

Polybasic acids, particularly those polybasic acids having from 2 to 4 nonfused rings in the molecule, are the most preferred carboxylic acids for the practice of this invention because they can be esterified to produce esters in high yields in significantly shortened periods of time. In this regard the dibasic non-fused binuclear acids are particularly good and are even more preferred among this particular class of compounds. Illustrative of this broad class of compounds are 2,2',3,3'-biphenyl tetracarboxylic acid, 2,2',2''-p-terphenyl tricarboxylic acid, 2,2'''-p-quaterphenyl dicarboxylic acid, 3,3'-o,p'-biphenyl dicarboxylic acid, 2,2'-bibenzyl dicarboxylic acid, (bicyclopentyl)-3,3'-dicarboxylic acid, and the like.

Especially preferred aromatic carboxylic acids are bibenzoic acid (4,4'-biphenyldicarboxylic acid), homoterephthalic acid (4-α-toluenedicarboxylic acid) and terephthalic acid (1,4-benzene dicarboxylic acid) because these acids can be wholly or partially esterified, as desired, to give high yields of ester within significantly short periods of time. These acids are particularly susceptible to esterification with low molecular weight tertiary phosphate esters, e.g., those compounds containing up to about 6 carbon atoms in the molecule. Especially significant and highly preferred embodiments comprise esterifying bibenzoic acid, homoterephthalic acid and terephthalic acid with trimethyl phosphate.

The reaction between the aromatic carboxylic acid and the tertiary phosphate ester is produced by the presence of an acid catalyst, said catalyst having the ability to provide hydrogen ions or the ability to coordinate with unpaired electrons. These catalysts are compounds selected from mineral acids, sulfonic acids, phosphonic acids and Lewis acids.

Generally, the temperature of reaction, at atmospheric pressure, is within a range of from about 50° C. to about 400° C. and preferably within a range of from about 150° C. to about 250° C. It is of course possible to use lower temperatures than 50° C. but the reaction is generally too slow to be practical. Also higher temperatures can be employed with good results when the reactants and products are not decomposable by the greater temperature. In other words, the higher the temperature the faster the rate of reaction, but the temperature employed should not be of such intensity as to produce any substantial decomposition of the products or reactants. Correspondingly lower or higher temperatures are used also if the reactions are carried out at elevated or reduced pressure. Higher or lower pressures can also be employed, dependent upon whether or not a low boiling reactant is employed and in some instances dependent upon whether or not a solvent is used. Where a low boiling solvent is used, for example, as when the reactants are immiscible in each other, it is generally desirable to employ some pressure. Most preferably, the reaction is generally carried out at substantially atmospheric pressure at reflux conditions.

Pursuant to the practice of this invention, esters of aromatic carboxylic acids can be obtained in significantly high yields in short periods of time, e.g., yields of as high as 98 percent, and higher, in periods of time as low as one-half hour, and even less.

The following non-limiting examples are illustrative of the invention, all parts being given in weight proportions except as otherwise specified.

EXAMPLE I

A glass lined reaction vessel was charged with 250 parts of bibenzoic acid (4,4'-diphenyl dicarboxylic acid), 3,000 parts of trimethyl phosphate and 5 to 10 parts of p-toluene sulfonic acid. The resultant mixture was heated rapidly, within a few minutes, to 200° C., and a low boiling liquid that formed was evolved from the reaction vessel and passed through a downward condensing system. After this liquid had finished distilling from the vessel, the condensing system was set for reflux. From 10 to 15 minutes after reaching reflux, solution of the solid occurred and a clear orange-red solution was formed. The mixture was maintained at reflux conditions for a total of 1½ hours, after which time the mixture was cooled to ambient temperature to produce crystallization. The solid was then recovered by filtration and the solids obtained washed with methanol. Approximately 270 parts of the solid was obtained in this manner. Recrystallization from dioxane produced 220 parts of purified crystalline product having a melting point of 212-213° C. whereas the literature reports the melting point of the dimethyl ester of bibenzoic acid at 212-213° C. It was thus found that after only 1½ hours heating under reflux conditions a yield of 92 percent of the dimethyl ester of bibenzoic acid was obtained.

In sharp contrast to the above example demonstrating the present invention, the following demonstration shows esterification of bibenzoic acid in accordance with a standard prior art procedure.

A glass lined reaction vessel was charged with 13 parts of bibenzoic acid and 135 parts of methanol. To this mixture was then added 85 parts of hydrogen chloride. The total mixture was refluxed for 96 hours until reaction had substantially ceased. The reaction mixture was then worked up by evaporating the solvent, then redissolved by adding 100-200 parts of chloroform. The chloroform was then washed with an aqueous sodium carbonate solution. Undissolved inert material was recovered by filtration from the aqueous and chloroform phases. The chloroform phase was dried and evaporated and methanol added. The undissolved solid was recovered as the dimethyl ester of bibenzoic acid. Unreacted bibenzoic acid was recovered by acidification of the sodium carbonate extract. A total yield of 6.5 parts of the dimethyl ester of bibenzoic acid was obtained. This corresponds to a yield of 85 percent.

Thus, less ester was obtained by the above prior art method than was obtained pursuant to the present invention. Further, this lower yield resulted despite the fact that a reaction time of 64 times as long was employed in the foregoing reaction as in that of Example I.

The following table presents illustrations of further runs made pursuant to the method described in Example I.

*Table*

| Ex. | Reactants | | Catalyst | Reaction Time (Hrs.) | Dimethyl Ester of Bibenzoic Acid, Parts | Yield, Percent |
|---|---|---|---|---|---|---|
| | Bibenzoic Acid, Parts | Trimethyl Phosphate, Parts | | | | |
| II | 200 | 1,200 | 18 parts sulfuric acid | 2.0 | 120 | 86 |
| III | 270 | 1,320 | 12 parts p-toluene sulfonic acid | 1.5 | 154 | 81 |
| IV | 500 | 3,000 | 24 parts p-toluene sulfonic acid | 1.0 | 293 | 83 |
| V | 500 | 3,000 | ...do... | 2.0 | 323 | 92 |
| VI | 300 | 1,800 | 150 parts diethyl etherate of boron trifluoride | 0.5 | 330 | 98.5 |

Example VII

A mixture of 3.5 parts of bibenzoic acid, 30 parts of trimethyl phosphate and 0.1 part of p-toluene sulfonic acid was refluxed for 40 minutes. After cooling the reaction mixture to room temperature the white flakes formed in the reaction were filtered off and washed several times with cold methanol. The quantity of the dimethyl ester of bibenzoic acid thus recovered from the reaction mixture was 3.4 parts, which corresponds to a yield of 87 percent.

Example VIII

Into a reaction vessel was charged 5 parts terephthalic acid, 30 parts trimethyl phosphate and 0.1 part p-toluene sulfonic acid. The reaction mixture was heated to reflux and maintained for a period of approximately 70 minutes. The reaction mixture was found to contain 1.54 parts of the half ester, e.g., the monomethyl ester of terephthalic acid. This corresponds to a yield of approximately 8.5 percent.

Example IX

When 30 parts triethyl phosphate, 0.1 part concentrated sulfuric acid and 5 parts of terephthalic acid are heated to reflux temperature and this temperature maintained for a period of 30 minutes, a substantial amount of the monoethyl ether of terephthalic acid is produced.

Example X

When 30 parts triethyl phosphate, 0.4 part of the monohydrate of p-toluene sulfonic acid and 5 parts terephthalic acid are heated to reflux temperature and this temperature maintained for a period of 30 minutes, a substantial yield of the monoethyl ester of terephthalic acid is produced.

Example XI

A glass lined reaction vessel was provided with a condensing system and various devices for measurement of reaction temperatures. The vessel was charged with the following proportions of reactants: 500 parts of pure terephthalic acid, 3600 parts of trimethyl phosphate and 0.3 part of concentrated sulfuric acid. The reactor was then closed. The reaction mixture was heated to a temperature of approximately 196° C. for one hour. At the end of this period of time, the reaction mixture contained 550 parts of dimethyl ester of terephthalic acid. This amounted to a yield of approximately 94 percent of the dimethyl ester based on the terephthalic acid originally present.

Example XII

In a glass lined reaction vessel, 70 parts of 1,3-benzene dicarboxylic acid, 97 parts of trimenthyl phosphate, and 2 parts of chlorobenzene sulfonic acid are mixed together and heated to a temperature of 200° C. This temperature is maintained for a period of 3 hours after which time the reaction mixture is discharged from the reactor. The reaction mixture contains a significant quantity of the menthyl ester of 1,3-benzene dicarboxylic acid.

Example XIII

To produce the isobutyl ester of 3,4,5-pyridine tricarboxylic acid, 90 parts of 3,4,5-pyridine tricarboxylic acid, 110 parts triisobutyl phosphate, and 4 parts of phosphoric acid are simultaneously added to a glass lined reaction vessel and the mixture heated to 300° C. for a period of 2 hours. After this time, the reaction mixture is discharged from the vessel. A significant quantity of the ester is produced.

Example XIV

A mixture of 150 parts of 1,3,5-benzene tricarboxylic acid and 700 parts of triisopropyl phosphate are added to a glass lined reaction vessel equipped with a thermometer and reflux condenser. To this mixture is then added 15 parts of trifluoroacetic anhydride, the mixture heated to 250° C. and maintained at this temperature for 2½ hours. A significant quantity of the isopropyl ester of the 1,3,5-benzene tricarboxylic acid is recovered from the reaction mixture.

Example XV

In a glass lined reaction vessel is mixed together 100 parts of 1,4-nahpthalene dicarboxylic acid, 400 parts of triethyl phosphate and 4 parts of the diethyl etherate of boron trifluoride. The mixture is then heated at 200° C. These conditions are maintained for a period of 2 hours after which time the reaction mixture is discharged from the reactor. The reaction mixture provides a highly significant quantity of the ethyl ester of 1,4-naphthalene dicarboxylic acid.

Example XVI 955 parts of 2,2'-biphenyl dicarboxylic acid, 1500 parts of tribenzyl phosphate and 200 parts of allyl sulfonic acid are added together within a glass lined reaction vessel and heated to a temperature of 150° C. for a period of 3 hours. Upon discharge of the reactor contents, it is found that the benzyl ester of 2,2'-biphenyl dicarboxylic acid is produced in significant yield.

Example XVII

A mixture of 290 parts 3,3'-bibenzyl dicarboxylic acid and 250 parts of tricyclohexyl phosphate are added to a glass lined reaction vessel equipped with temperature measuring devices and a reflux condensing system. To this mixture is then added 140 parts of butyl sulfonic acid and the mixture heated to a temperature of 200° C. This temperature is maintained for a period of 2½ hours after which time the reaction mixture is removed from the reactor. The cyclohexyl ester of 3,3'-bibenzyl dicarboxylic acid is obtained in significant yield.

Example XVIII

In a glass lined reaction vessel is mixed together 550 parts 9,10-anthracene dicarboxylic acid, 600 parts of propyl (diphenyl) phosphate and 25 parts of mesitylene sulfonic acid. The mixture is then heated at 150° C. These conditions are maintained for a period of 3 hours after which time the reaction mixture is discharged. The reaction mixture provides a significant yield of mixed propyl and phenyl esters of 9,10-anthracene dicarboxylic acid.

Example XIX

To produce the phenyl ester of 4,5-carbazole dicarboxylic acid, add together 900 parts 4,5-carbazole dicarboxylic acid, 2700 parts triphenyl phosphate and 77 parts of the monohydrate of p-toluene phosphonic acid within a glass lined reaction vessel and heat the mixture at 200° C. for a period of 2 hours. At the termination of this period of time discharge the reaction mixture from the vessel. A significant yield of the phenyl ester is obtained within the reaction mixture.

Example XX 20 parts 4-terphenyl carboxylic acid, 45 parts trioctyl phosphate, and 0.5 part benzene sulfonic acid are mixed together and heated at 200° C. for a period of 4 hours. Upon discharge of the reaction mixture from the reactor it is found that the reaction mixture provides a significant quantity of the octyl ester of 4-terphenyl carboxylic acid.

Example XXI

A mixture of 100 parts 3',3''-terphenyl dicarboxylic acid, 100 parts 2-chloropropyl dibutyl phosphate and 5 parts trifluoroacetic acid are added together within a reaction zone, and the mixture heated at 200° C. for a period of 3 hours. Upon discharge and recovery of the ester from the reaction mixture it is found that a significant yield of the 2-chloropropyl and butyl esters of 3',3''- terphenyl dicarboxylic acid is obtained in the reaction mixture.

*Example XXII*

A mixture of 3½ parts of bibenzoic acid, 30 parts of tricresyl phosphate and 0.5 part of the monohydrate of p-toluene phosphonic acid is refluxed for 1 hour. After cooling the reaction mixture to ambient temperature, the crystals formed in the reaction are filtered off and washed several times with cold methanol. A significant quantity of the cresyl ester of bibenzoic acid is recovered from the reaction mixture.

*Example XXIII*

Examples I-X are repeated employing as the catalyst the monohydrate forms of methyl phosphonic acid, isoamyl phosphonic acid, 3,5-dimethyloctyl phosphonic acid, cyclopentyl phosphonic acid, p-benzene phosphonic acid and p-toluene phosphonic acid; and also the catalysts aluminum trichloride, boron tribromide and zinc chloride. Again, a significant yield of the ester is obtained in each instance.

As stated, the preferred tertiary phosphate ester contains generally from 3 to about 30 carbon atoms in the molecule. The hydrocarbon substituents or radicals of the molecule can be acyclic or cyclic, saturated or unsaturated, and where cyclic can be aromatic or nonaromatic, carbocyclic or heterocyclic. Thus, the hydrocarbon substituents can be alkyls, alkenyls, aryls, aralkyls, alkaryls, cycloalkyls, cycloalkenyls, and cycloalkenyl alkyls, and preferably contain from 1 to 10 carbon atoms. Where the substituents of the molecule are acyclic, the radicals can be straight chain or branch chain. The hydrocarbon substituents of the molecule can also be substituted or unsubstituted by moities which are essentially inert in the principal reaction as for example, halogens such as chlorine, fluorine, or the like; pseudo halogens such as thiocyanate, cyanate, and the like; nitrogen, sulfur, oxygen, phosphorus, and the like. Further examples of suitable compounds are such trialkyl phosphates as methyldiethyl phosphate, dimethylpropyl phosphate, tributyl phosphate, tridecyl phosphate, and the like, and such aryl and mixed alkylaryl phosphates as dimethylorthotolyl phosphate, and dimethylphenyl phosphate. It will also be understood that those compounds wherein sulfur is substituted for oxygen are intended to be covered by this invention, for example such compounds as tris(β-chloroisopropyl)-thiono phosphate, and the like. Illustrative of tertiary phosphate esters containing cyclic hydrocarbon radicals in the molecule are such aromatic phosphate esters as triphenyl phosphate, tribenzyl phosphate, tri-t-cinnamyl phosphate, tritolyl phosphate, trinaphthyl phosphate, diethylphenyl phosphate, ethyldiphenyl phosphate, dibutylphenyl phosphate, and such non-aromatic cyclic phosphate esters as triisopyromucyl phosphate, cyclohexyldiisoamyl phosphate, cyclohexyldimethyl phosphate, trifenchyl phosphate, and the like.

Generally the most preferred tertiary phosphate esters are those containing like radicals in the molecule. This is because where the substituents of the molecule are different, mixed esters will generally result in the product. In some instances, of course, this is desirable.

Trialkyl phosphate esters are especially preferred esterifying agents because they are capable of especially rapid reaction and of producing especially high yields of ester. These esters are also preferred because they are readily available at relatively low cost. Of unique and outstanding importance among this class of trialkyl phosphate esters are those esters containing up to about 6 carbon atoms in the molecule. Especially preferred esters of this class are trimethyl phosphate and triethyl phosphate which possess extremely good ability to react rapidly and produce very high yields of esters.

Preferred aromatic carboxylic acids include those compounds containing from 1 to about 6 carboxylic acid groups in the molecule, containing from 7 to about 24 carbon atoms and having from 1 to about 4 aromatic rings in the molecule, whether the rings be fused or nonfused. The rings or substituents attached to the rings can also be substituted or unsubstituted with moities which are preferably inert to the principal reaction as for example, nitrogen, sulfur, oxygen, halogens, pseudo halogens, and the like, as discussed above in relation to the phosphate esters. Exemplary of such compounds are 1-anthroic acid, 1-naphthaleneacrylic acid, [biphenyl]-2-carboxylic acid, 5,5'-biveratric acid, benzene pentacarboxylic acid, mellitic acid, 1,4,5,8-naphthalene tetracarboxylic acid, 2,2',2'',3,5',5''-m-terphenyl hexacarboxylic acid, 2,2',2'', 2''',3,3''''-p-quaterphenyl hexacarboxylic acid, and the like.

Most preferred among these compounds are the polybasic acids, particularly those polybasic acids having from 2 to about 4 nonfused rings in the molecule. Exemplary of such compounds are 2,2-biphenyldicarboxylic acid, 2,2',2'' - p - terphenyltricarboxylic acid, 4,5,5',6,6'-o,p'-bitolylpentacarboxylic acid and the like.

The nonfused binuclear dibasic acids are an especially preferred class of acids inasmuch as they are especially suitable for producing significantly high yields of ester very rapidly. Exemplary of these preferred compounds are 1,1'-o,o'-biphenyldicarboxylic acid, 6,6'-biveratric acid, and the like.

As stated, the reaction between the tertiary phosphate ester and the aromatic carboxylic acid is acid catalyzed. Among the acid catalysts employed are inorganic mineral acids exemplary of which are hydrochloric acid, sulfuric acid, phosphoric acid and the like. Lewis acids, namely those compounds that will accept electrons, are highly suitable acids for the practice of this invention. These acids are well known to the art and are fully defined, for example, by Noller, Chemistry of Organic Compounds, W. B. Sanders Company, 1951, at pages 233-235; and by Stone, Chemical Review, vol. 58, 1958, at page 101. Illustrative of these classes of acids are boron tribromide, boron trifluoride, boron trichloride, aluminum trichloride, stannic chloride, zinc chloride, ferric chloride, trifluoroacetic anhydride, and the like. Hydrocarbyl sulfonic acids are also highly useful. Such compounds can be considered as derivatives of hydrocarbons in which one or more hydrogen atoms have been replaced by the sulfonic acid group. Such acids thus always contain a hydrocarbon group, for example, an alkyl, aryl, aralkyl, alkaryl, cycloalkyl, alkenyl, cycloalkenyl, or a cycloalkenyl alkyl radical. These radicals can be substituted or unsubstituted so long as the substituted member, or members, are substantially inert in the principal reaction. Illustrative of such substituents are halogens such as chlorine, bromine and the like, pseudo halogens such as cyanide, isothiocyanate and the like, nitrogen, sulfur, phosphorus, oxygen and the like. Among these acids the most preferred are the hydrocarboyl sulfonic acids which contain from 1 to about 18 carbons atoms in the molecule. Exemplary of such sulfonic acids are methyl sulfonic acid, ethyl sulfonic acid, isopropyl sulfonic acid, isoamyl sulfonic acid, 2-ethylhexyl sulfonic acid, 3,5-dimethyloctyl sulfonic acid, dodecyl sulfonic acid, octadecyl sulfonic acid, cyclopentyl sulfonic acid, cyclohexyl sulfonic acid, 3-pentenyl sulfonic acid, 2-methyl-3-ethyl-4-pentenyl sulfonic acid, 2-ethyl-2-hexynyl sulfonic acid, phenyl sulfonic acid, butylphenyl sulfonic acid, phenethyl sulfonic acid, allyl sulfonic acid, and the like.

The most preferred of these acids are the aromatic sulfonic acids, particularly in hydrate form. These acids are superior catalysts inasmuch of they are instrumental in producing high yields of ester and cause little or no discoloration of the product. Exemplary of these most preferred acids are benzene sulfonic acid, 1,5-naphthalene disulfonic acid, and the like.

Phosphonic acids, derivatives of hydrocarbons wherein one or more hydrogen atoms have been replaced by the phosphonic acid group, containing preferably from 1 to about 18 carbon atoms in the molecule are also highly suitable as catalysts for use in the present invention. These acids are in fact analogous to the sulfonic acids described above but for the substitution of a phosphoric acid group in the hydrocarbon in lieu of a sulfonic acid group. Exemplary of such phosphonic acids are ethyl phosphonic acid, amyl phosphonic acid, decyl phosphonic acid, dodecyl phosphonic acid, octadecyl phosphonic acid, cyclopentyl phosphonic acid, butylphenyl phosphonic acid, 1,5-naphthalene diphosphonic acid, and the like.

A novel feature of this invention is that partial or whole esters can be prepared. Thus, by varying the concentration of the reactants, the concentration of the catalyst, the time of which the reaction mixtures are subjected to heat, the intensity of heat and even by selection of the particular aromatic carboxylic acid and teritary phosphate ester, partial or whole esters can be prepared quite conveniently. In the preparation of the whole ester for example it is preferable to employ a molar ratio of phosphate-to-each carboxylic acid group of the aromatic carboxylic acid of from about 2:3 to about 100:1. The molar ratio of the reactants in producing the whole ester in a given time however is also somewhat affected by the temperature and the nature of the reactants. Thus, for example, where a high temperature is used the reaction to produce a whole or partial ester proceeds faster than where a lower temperature is employed. The same is true of the use of a catalyst, the greater the concentration of the catalyst, the faster is the reaction to produce the whole or partial ester. Since the partial ester is intermediate in the formation of the whole ester these variables are interlocking and affect the rate of formation of the ester and to this extent also determines what esters are formed. Another variable is that determined by the nature of the reactants. Thus, the higher the molecular weight of the reactants the slower is the rate of reaction.

In the preparation of partial esters, it is generally preferable to employ a shorter heating or reflux period, a lesser concentration of acid catalyst and a smaller excess of the tertiary phosphate ester. To produce partial esters it is generally preferable to employ about a molar ratio of phosphate-to-each carboxylic acid group of the aromatic carboxylic acid of from about 1:1 to about 10:1 and to employ from about 10 percent to about 50 percent as much acid catalyst as when it is desired to produce the whole ester. Generally also, shorter reaction periods are preferable in preparing the partial ester.

The acid catalysts are generally employed in concentrations of from about 0.001 weight percent to about 20 weight percent, based on the weight of the aromatic carboxylic acid and partially dependent upon whether a whole or partial ester of the aromatic carboxylic acid is neie. Arnndshdrrd desired. A preferred concentration however in producing the whole ester is from about 0.1 to about 5 weight percent, based on the aromatic carboxylic acid in the reaction mixture. Where the whole ester of a dicarboxylic acid is desired for example, an especially preferred acid catalyst concentration is from about 1 to about 3 percent, based on the weight of the aromatic carboxylic acid in the reaction mixture. In producing partial esters generally from about one-tenth to about one-half as much catalyst is employed as when producing the whole ester. Thus, in producing partial esters there is employed from about 0.0005 weight percent to about 10 weight percent of the acid catalyst, based on the weight of the aromatic carboxylic acid. It is generally preferable however to employ from about 0.2 weight percent to about 3 weight percent of the acid catalyst when the partial ester is desired. From about 1 weight percent to about 2 weight percent of the acid catalyst has been found to give the best results in producing the partial ester. It is understood however that catalyst concentration is only one variable and can be positively or negatively compensated for by variation in reaction time, temperature, concentration and proportion or reactants, nature of the reactants themselves, all of which produce interlocking effects.

Pursuant to the present process, reaction can be conducted between the tertiary phosphate ester and the aromatic carboxylic acid in the presence of an acid catalyst with or without a solvent. Generally however, it is not necessary to employ a solvent particularly where the aromatic carboxylic acid and the tertiary phosphate ester are mutually soluble within each other at the desired temperature conditions. Where the reactants however are not sufficiently soluble in each other at the desired temperature of operation it is desirable to employ a sufficient amount of solvent to produce solution of the reactants. Almost any solvent can be employed which will dissolve the reactants but which itself does not enter substantially into reaction. Illustrative of solvents which can be employed are ethers such as diethylene glycol dimethyl ether, tetrahydrofuran, dioxane, ethylisopropyl ether, ethyloctyl ether, hexylphenyl ether, isoamyl-2-naphthyl ether, methyl-m-tolyl ether, 1-naphthyl propyl ether, phenyl propyl ether, and the like. Aliphatic hydrocarbon solvents useful in the practice of this invention are, for example, octane, dodecane, petroleum ether, and the like. Aromatic solvents are the most preferred of solvents because these are generally more compatible with the system and there is little or no side reactions in which the solvent can participate. Generally such solvents contain from 6 to 15 carbon atoms. Illustrative of such solvents are benzene, toluene, xylene, cumene, 2,4,6-tri-tert-propyl benzene, aromatic naphthas, and the like. Other suitable solvents will therefore be evident to those skilled in the art.

It is within the purview of the present invention to carry out the process in batchwise, intermittent, semicontinuous or in a fully continuous manner. For batchwise operations the process may be conducted as in a kettle equipped with a reflux condenser at the boiling point of the reaction mixture, or there may be employed an autoclave or equipment wherein the reaction mixture is heated under the pressure which develops autogenously at the reaction temperature or at a higher pressure applied, for example, by introduction of an inert gas. The same or equivalent equipment may be employed for semicontinuous operation. It is desirable, for economy, to obtain maximum practical conversion of the aromatic carboxylic acid to the ester.

It will be understood that numerous specific embodiments of the invention can be practiced without departure from the letter and spirit of the present claims.

I claim:

1. A process for the production of esters of aromatic polycarboxylic acids which comprises reacting a tertiary phosphate ester characterized by containing from 3 to about 30 carbon atoms in the molecule with an aromatic polycarboxylic acid characterized by containing from 7 to about 24 carbon atoms, up to about 6 carboxylic acid groups and from 1 to about 4 aromatic rings in the molecule in the presence of an acid catalyst at an elevated temperature of from about 50 to about 450° C., sufficient to effect said reaction, said acid catalyst being selected from a group consisting of mineral acids, Lewis acids, phosphonic acids and sulfonic acids.

2. A process for the production of esters of aromatic polycarboxylic acids, comprising reacting a trialkyl phosphate with an aromatic dicarboxylic acid in the presence of an acid catalyst at an elevated temperature of from about 50 to about 450° C., sufficient to effect said reaction, said acid catalyst being selected from a group consisting of mineral acids, Lewis acids, phosphonic acids and sulfonic acids.

3. A process for the production of esters of aromatic polycarboxylic acids comprising reacting trimethyl phosphate with an aromatic dicarboxylic acid characterized by containing from up to about 24 carbon atoms and from 1 to about 4 aromatic rings in the molecule in the presence of an acid catalyst at an elevated temperature of from about 50° C. to about 450° C., sufficient to effect said reaction, said acid catalyst being selected from a group consisting of mineral acids, Lewis acids, phosphonic acids and sulfonic acids.

4. A process for the production of esters of aromatic polycarboxylic acids comprising reacting a trialkyl phosphate characterized by containing substituents having from 1 to about 10 carbon atoms each with an aromatic dicarboxylic acid characterized by containing from 2 to 4 non-fused rings and up to about 24 carbon atoms in the molecule in the presence of an acid catalyst at a temperature ranging from about 150° C. to about 250° C., sufficient to effect said reaction, said acid catalyst being selected from a group consisting of mineral acids, Lewis acids, phosphonic acids and sulfonic acids.

5. A process for the production of esters of aromatic polycarboxylic acids comprising reacting trimethyl phosphate with bibenzoic acid in the presence of an acid catalyst at an elevated temperature of from about 150° C. to about 250° C., sufficient to effect said reaction, said acid catalyst being selected from a group consisting of mineral acids, Lewis acids, phosphonic acids and sulfonic acids.

6. The process of claim 5 wherein the aromatic polycarboxylic acid employed in the reaction is homoterephthalic acid.

7. The process of claim 5 wherein the aromatic polycarboxylic acid employed in the reaction is terephthalic acid.

8. The process of claim 1 wherein the acid catalysts employed are aromatic sulfonic acids characterized by containing up to about 18 carbon atoms in the molecule.

9. The process of claim 1 wherein the acid catalyst is a phosphonic acid characterized by containing up to about 18 carbon atoms in the molecule.

References Cited in the file of this patent

Kosolapoff, "Organo-Phosphorus Compounds," pages 188, 232–3, Wiley (1950).

Fieser et al., "Organic Chemistry," 3rd edition, pages 174–6, 178, Reinhold (1956).

Hoffmann et al., J.A.C.S., volume 79, pages 4759–61 (1957).